(12) United States Patent
Catalano et al.

(10) Patent No.: US 6,766,040 B1
(45) Date of Patent: Jul. 20, 2004

(54) SYSTEM AND METHOD FOR CAPTURING, ENROLLING AND VERIFYING A FINGERPRINT

(75) Inventors: John F. Catalano, Melvin Village, NH (US); Paul H. Magnant, Richmond, VT (US)

(73) Assignee: Biometric Solutions, LLC, New York, NY (US)

( * ) Notice: Subject to any disclaimer, the term of this patent is extended or adjusted under 35 U.S.C. 154(b) by 731 days.

(21) Appl. No.: 09/677,257

(22) Filed: Oct. 2, 2000

(51) Int. Cl.$^7$ ................................................ G06K 9/00
(52) U.S. Cl. ...................... 382/115; 382/209; 340/5.53; 356/71; 713/186
(58) Field of Search .................................. 382/115, 124, 382/125, 126, 313, 209, 190; 356/71; 713/202, 182, 183, 184, 185, 186; 351/206, 218; 340/5.2, 5.52, 5.53, 581–583

(56) References Cited

U.S. PATENT DOCUMENTS

| | | | |
|---|---|---|---|
| 4,047,154 A | 9/1977 | Vitols et al. | 340/146.3 |
| 4,208,651 A | 6/1980 | McMahon | 340/146.3 |
| 4,794,260 A | 12/1988 | Asano et al. | |
| 4,817,183 A | 3/1989 | Sparrow | |
| 4,872,203 A | 10/1989 | Asai et al. | 382/4 |
| 5,099,131 A * | 3/1992 | Brownrigg et al. | 250/458.1 |
| 5,105,467 A | 4/1992 | Kim et al. | 382/4 |
| 5,140,642 A | 8/1992 | Hsu et al. | |
| 5,177,792 A | 1/1993 | Morita | 382/4 |
| 5,291,560 A * | 3/1994 | Daugman | 382/117 |
| 5,420,937 A | 5/1995 | Davis | 382/125 |
| 5,426,708 A | 6/1995 | Hamada et al. | |
| 5,493,621 A | 2/1996 | Matsumura | 382/125 |
| 5,509,083 A | 4/1996 | Abtahi et al. | 382/124 |
| 5,572,597 A | 11/1996 | Chang et al. | |
| 5,613,014 A | 3/1997 | Eshera et al. | |

(List continued on next page.)

FOREIGN PATENT DOCUMENTS

| | | |
|---|---|---|
| JP | H10-63844 | 3/1998 |
| WO | WO 99/26187 | 5/1999 |
| WO | WO 99/56429 | 11/1999 |

OTHER PUBLICATIONS

"Adaptive flow orientation based feature extraction in fingerprint images," by Ratha et al., Department of Computer Science, Michigan State University, Michigan, Feb. 12, 1995.

(List continued on next page.)

Primary Examiner—Jayanti K. Patel
Assistant Examiner—Sheela Chawan
(74) Attorney, Agent, or Firm—Gibbons, Del Deo, Dolan, Griffinger & Vecchione

(57) ABSTRACT

A low-power, fully self-contained fingerprint capture, enrollment and verification method and device (100). The device includes a logic unit (110), a memory (120), a fingerprint sensor (130) and an interface (150) to an external unit (140). Included in the memory is a program (126) that includes a sensor data capture module (200), an image processing module (202), a minutia extraction module (204), a template creation module (206), a template compare module (208), and a database (210). The processes for capturing, enrolling and verifying a fingerprint are designed to be minimally computationally intensive. This allows implementation of these processes in a portable, battery-powered unit using hardware with limited memory and computing capability, or implementation in a PC with substantial performance advantages relative to known fingerprint capture, enrollment and verification processes and devices. Fingerprint verification is performed using fingerprint templates storing information as to location and type of minutia point, and direction of fingerprint ridge leading to the minutia point, rather than full image-to-image comparison.

16 Claims, 9 Drawing Sheets

U.S. PATENT DOCUMENTS

| | | | |
|---|---|---|---|
| 5,631,971 A | 5/1997 | Sparrow | 382/125 |
| 5,631,972 A | 5/1997 | Ferris et al. | |
| 5,659,626 A | 8/1997 | Ort et al. | |
| 5,736,734 A | 4/1998 | Marcus et al. | |
| 5,845,005 A | 12/1998 | Setlak et al. | |
| 5,878,158 A | 3/1999 | Ferris et al. | |
| 5,883,971 A | 3/1999 | Bolle et al. | 382/124 |
| 5,903,225 A * | 5/1999 | Schmitt et al. | 340/5.25 |
| 5,915,035 A | 6/1999 | Hsiao et al. | 382/125 |
| 5,917,928 A | 6/1999 | Shpuntov et al. | |
| 5,926,555 A | 7/1999 | Ort et al. | |
| 5,937,082 A | 8/1999 | Funada | 382/125 |
| 5,953,443 A | 9/1999 | Hiratsuka et al. | 382/125 |
| 5,963,656 A | 10/1999 | Bolle et al. | 382/124 |
| 5,995,640 A | 11/1999 | Bolle et al. | 382/124 |
| 6,005,963 A | 12/1999 | Bolle et al. | 382/124 |
| 6,016,476 A | 1/2000 | Maes et al. | 705/1 |
| 6,018,586 A | 1/2000 | Kamei | 382/125 |
| 6,023,522 A | 2/2000 | Draganoff et al. | 382/124 |
| 6,041,133 A | 3/2000 | Califano | 382/124 |
| 6,049,620 A | 4/2000 | Dickinson et al. | 382/124 |
| 6,049,621 A | 4/2000 | Jain et al. | 382/125 |
| 6,064,753 A | 5/2000 | Bolle et al. | 382/125 |
| 6,072,895 A | 6/2000 | Bolle et al. | 382/125 |
| 6,092,192 A | 7/2000 | Kanevsky et al. | 713/186 |
| 6,111,978 A | 8/2000 | Bolle et al. | |
| 6,118,891 A | 9/2000 | Funada | |
| 6,134,340 A | 10/2000 | Hsu et al. | |
| 6,181,807 B1 | 1/2001 | Setlak et al. | |
| 6,185,318 B1 | 2/2001 | Jain et al. | |
| 6,195,448 B1 | 2/2001 | Schiller | |
| 6,212,290 B1 | 4/2001 | Gagne et al. | |
| 6,241,288 B1 | 6/2001 | Bergenek et al. | |
| 6,266,433 B1 | 7/2001 | Bolle et al. | |
| 6,314,197 B1 | 11/2001 | Jain et al. | |
| 6,317,544 B1 * | 11/2001 | Diehl et al. | 385/115 |
| 6,381,347 B1 | 4/2002 | Teng et al. | |
| 6,400,836 B2 | 6/2002 | Senior | |
| 6,411,728 B1 * | 6/2002 | Lee et al. | 382/125 |
| 6,484,260 B1 * | 11/2002 | Scott et al. | 713/186 |
| 6,532,298 B1 * | 3/2003 | Cambier et al. | 382/117 |
| 2002/0012455 A1 | 1/2002 | Benckert | |
| 2002/0018585 A1 | 2/2002 | Kim | |
| 2002/0030359 A1 | 3/2002 | Bergenek et al. | |
| 2002/0034322 A1 | 3/2002 | Lichtermann et al. | |
| 2002/0060243 A1 | 5/2002 | Janiak et al. | |
| 2002/0061125 A1 | 5/2002 | Fujii | |
| 2002/0089410 A1 | 7/2002 | Janiak et al. | |

OTHER PUBLICATIONS

"An Identity Authenticiation System Using Fingerprints," by Jain et al., Department of Computer Science, Michigan State University, Michigan, and Exploratory Computer Vision Group, IBM T.J. Watson Research Center, New York.

"Fingerprint Image Enhancement: Algorithm and Performance Evaluation." by Hong et al., Pattern Recognition and Image Processing Laboratory, Deptarment of Computer Science, Michigan State University, Michigan.

"An Aiproved Image Enhancement Scheme for Fingerprint Minutiae Extraction in Biometric Identification", source(s): Universidad Politenica de Madrid, Jul. 17, 2002, pp. 1–9. Web address 216 239 37 100.

"Automated Fingerprint identification System", Hyundai, 2002.

"Extraction of Singular Points from Directional Fields of Fingerprints", University of Twente, Feb. 2001.

"An Intrinsic Coordinate System for Fingerprint Matching", University of Twente, Jun. 6–8, 2001 pp. 1–7, 3rd Instructional Conference on Audio and Video based Biometric Person Authorization Sweden.

"Learning Fingerprint Minutiae Location and Type", author(s); Salil Prahhakar, Anil K. Jain, Sharath Pankanti, Sep. 3–8, 2000, pp. 1–27.

"A Fingerprint Classification Technique Using Directional Images", Yildiz Technical University.

"Fingerprint Image Enhancement using Filtering Techniques", Ben–Gurion University, Jul. 17, 2002, pp. 1–11, web address 216.239.35.100.

"Graphics and Security: Exploring Visual Biometrics", ComputerGraphics.

"Verification Watermarks on Fingerprint Recognition and Retrieval", Minerva M. Yetung, Sharath Pankanti.

* cited by examiner

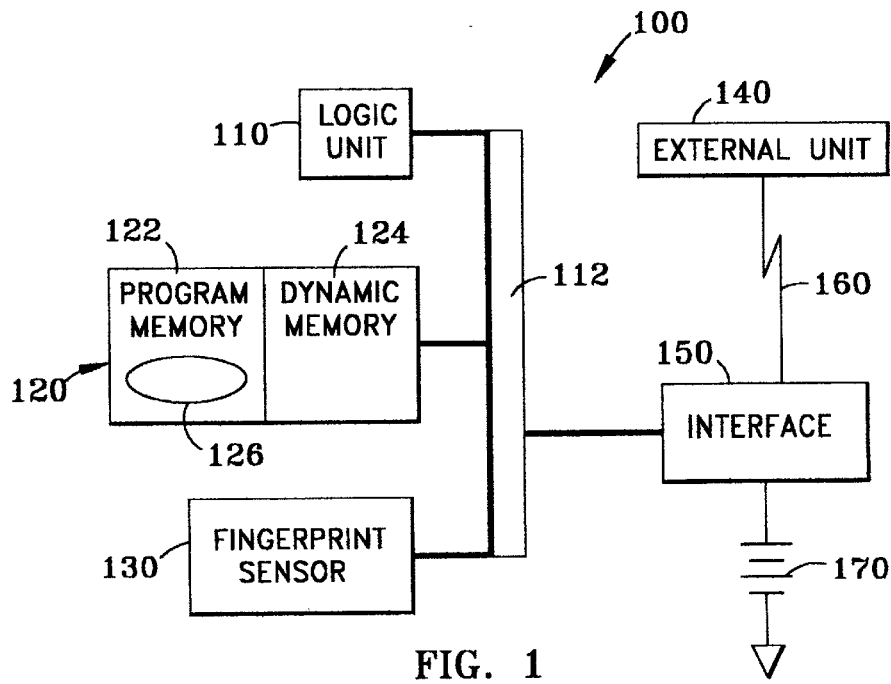
FIG. 1
FIG. 2
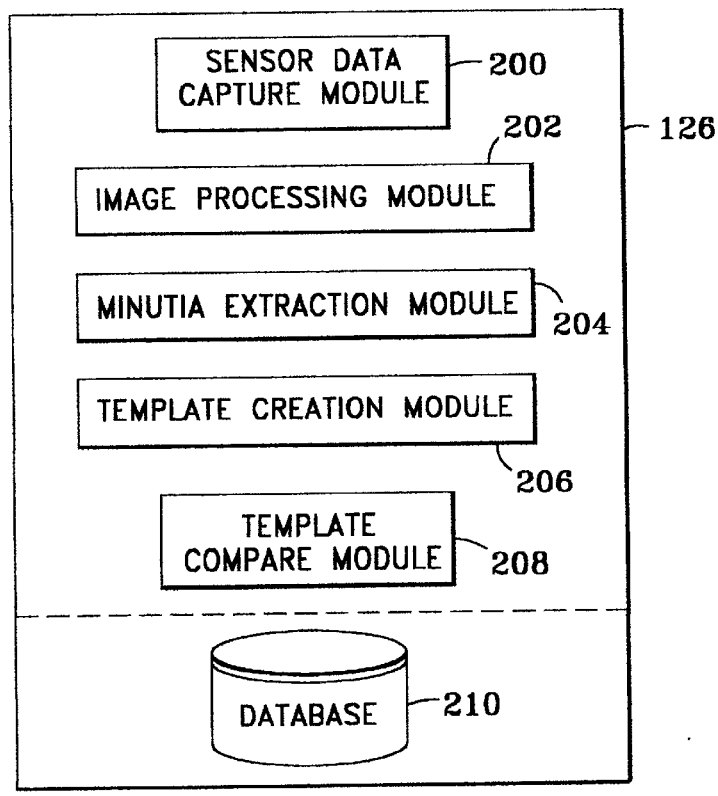

FIG. 6a
FIG. 6b
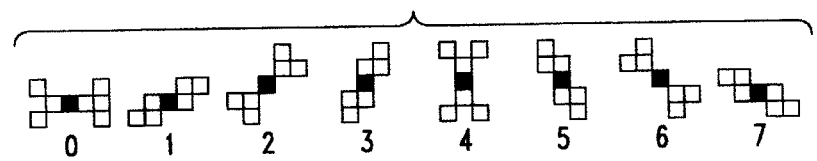
FIG. 7

BEFORE

AFTER

SYSTEM AND METHOD FOR CAPTURING, ENROLLING AND VERIFYING A FINGERPRINT

FIELD OF INVENTION

The present invention relates to an electronic fingerprint identification device. More specifically, the present invention relates to a stand-alone, low-power, portable electronic fingerprint identification device featuring fingerprint identification algorithms that are designed to minimize the use of computationally intensive operations.

BACKGROUND OF THE INVENTION

Biometric devices such as fingerprint identification devices have become increasingly popular in recent years, their most common uses being for security and access control. They are considered more secure than personal identification (PIN) numbers or cards because a fingerprint cannot be forged and possession of a fingerprint cannot be transferred.

There has also been a heightened demand among consumers for increased portability in computing, communications, and other devices for which access control is necessary or desirable. Among other developments there has been a proliferation of portable communication, computing and network interface devices such as personal digital assistants ("PDAs"), beepers, pages, information appliances, Internet access devices and the like. However, existing fingerprint identification devices are not generally designed to interface with such existing devices, and do not typically include the stand-alone, low-power capabilities desired for portable devices.

Existing fingerprint devices generally scan a fingerprint and transmit the image through a serial connection to a personal computer (PC). However, these devices require the use of software that is installed on PC having at least a PENTIUM® class microprocessor operating at 200 MHz or more in order to process the fingerprint image and perform enrollment, verification, and database functions. More particularly, known algorithms for performing such functions are sufficiently computationally intensive that only a relatively powerful microprocessor can perform the operations necessary to identify a fingerprint in a commercially reasonable period of time. For instance, known algorithms use functions such as Fourier transforms, and complete image-to-image comparisons, which require substantial computing power to execute in a reasonable period of time. Requiring a PC to process the fingerprint image adds to the expense of such devices makes them unusable by owners of portable computing, communication and other devices, and generally diminishes the applications in which they can be used.

Also known in the art are fingerprint identification devices that contain embedded or autonomous fingerprint capture and verification software and thus do not require a PC to process the fingerprint image, such as the Sony® FIU fingerprint identification unit. The power requirements of these devices are substantial and require an external power supply, which diminishes their portability and convenience and their usability with PDAs, cellular telephones, and other portable devices. As such, these devices cannot be considered to operate on a "standalone" basis.

At least one attempt has been made to design a portable, battery powered, stand-alone biometric (including fingerprint) identification device, as described in International Application WO 99/56429, assigned to Identix Incorporated. Unfortunately, because of the RISC microprocessor, DRAM memory and A/D converter, the peak power consumption is estimated to be on the order of 4.3 Watts ("W"). This power consumption is substantially in excess of what is commercially acceptable for many applications. Indeed, for many applications it is essential the fingerprint identification device operate on low-cost batteries that can operate for extended periods of time, i.e., weeks to months, without replacement. To achieve this goal, and provide fingerprint identification with a high degree of accuracy, it is desirable that peak power consumption of portable, stand-alone fingerprint devices not exceed about 1 W. The computationally intensive nature of known fingerprint identification algorithms and the power consumption demands of existing memory and processor devices has, it is believed, made attainment of this objective an impossibility.

Thus, there exists a need in the art for a stand-alone, low-power, battery-operated, compact device that is capable of verifying and/or enrolling a fingerprint relative quickly and with a high degree of accuracy.

SUMMARY OF THE INVENTION

One aspect of the present invention is a biometric verification device for providing secure access to a unit connected to the device. The device includes a biometric sensor capable of sensing a biometric trait of a user that is unique to the user and providing a first signal containing information representing the biometric trait. The device also includes a processing unit connected to the biometric sensor so as to receive the first signal. The processing unit is adapted to compare the information with biometric data stored in the processing unit representing a biometric trait of an enrolled person, and provide a verification signal indicating whether or not the information corresponds sufficiently with the biometric data to verify the user is the enrolled person. The processing unit completes the comparison and generates the verification signal within 20 seconds of when the biometric sensor senses the biometric trait using no more than 1 W of peak power.

Another aspect of the present invention is a system for extracting fingerprint minutia points from a first monochrome image containing an x-y array of pixels, each representing either a fingerprint ridge or a fingerprint valley. The x-y array is divided into a plurality of contiguous local blocks, each having a predetermined number of the pixels arranged in rows and columns. Each minutia point is one of several types. The system includes a scanner module that scans lines of pixels in each local block to detect the position of segments of pixels in each local block representing a fingerprint ridge. Also included is a comparator module that compares each of the ridge segments detected by the scanner module in each local block with adjacent ridge segments to determine if a minutia point exists, and identifies its position and minutia point type. The system further includes a ridge direction module that determines direction of fingerprint ridges leading to each minutia point determined by the comparator module, and a minutia list module that saves the position and type of minutia points determined by the comparator module and fingerprint ridge directions determined by the ridge direction module.

Yet another aspect of the present invention is a fingerprint identification device that includes a sensor for providing an output signal containing information representing attributes of a user's fingerprint positioned proximate the sensor that are unique to the user. The device also includes a memory for storing a first template containing attributes of a fingerprint of a first person that are unique to the first person and a logic unit connected to the memory. A program is stored in the memory that, in cooperation with the memory and logic unit: (i) creates the first template using the information in the output signal from the fingerprint sensor that represents unique attributes of the first person's fingerprint positioned proximate the sensor; (ii) creates a second template using the information in the output signal from the fingerprint sensor that represents in less than 1 K bytes of data unique attributes of a user's fingerprint positioned proximate the sensor; and (iii) verifies if the user is the first person by attempting to match the unique attributes in the first template with the unique attributes in the second template.

Still another aspect of the present invention is a method of creating a template containing attributes of a fingerprint unique to a first person, the fingerprint having a plurality of minutia points of one or more types and a ridge leading to each of the minutia points. The method comprises the steps of (a) identifying the location and type of a plurality of minutia points on the fingerprint, (b) identifying the direction of the ridge leading to each minutia point, and (c) using no more than 1 K bytes of data, storing the location and type of the minutia points identified in step a and the direction of the ridge leading to each minutia point identified in step b.

BRIEF DESCRIPTION OF THE DRAWINGS

FIG. 1 is a block diagram representation of the major elements of the fingerprint enrollment and verification device of the present invention and the external unit with which the device is designed to operate;

FIG. 2 is a block diagram representation of the major components of the software program of the device illustrated in FIG. 1, along with the database used with such software module;

FIG. 6a is an idealized representation of a fingerprint image obtained from the fingerprint sensor of the device of FIG. 1;

FIG. 6b illustrates the fingerprint ridge orientation direction and orientation number for each of the local blocks in the fingerprint image of FIG. 6a;

FIG. 7 illustrates one example of the pixels used relative to a target pixel in the directional image filtering process for each of the eight orientation numbers illustrated in FIG. 6b;

DETAILED DESCRIPTION OF THE INVENTION

Figure 4:
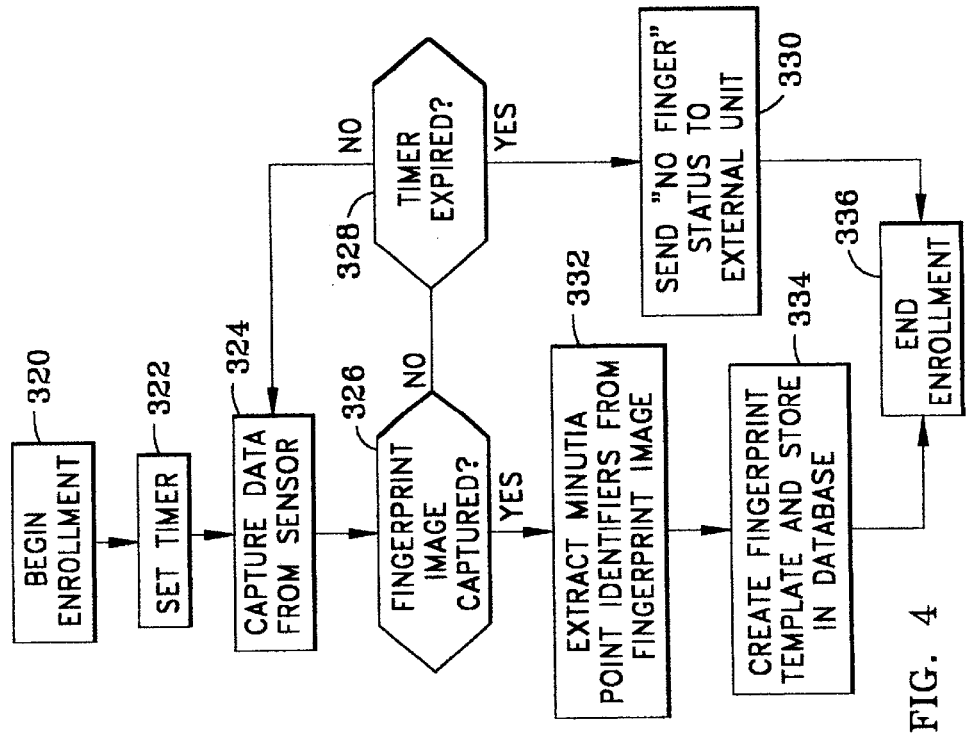
FIG. 4 is a flow diagram illustrating the steps of the fingerprint enrollment process for the device of FIG. 1.

Referring to FIG. 1, the present invention is a low-power, standalone, fully self-contained, battery-powered fingerprint enrollment and verification device 100. As described in more detail below, device 100 permits rapid enrollment of multiple fingerprints and permits rapid verification that the fingerprint of a user corresponds to a previously enrolled fingerprint. These functions may be achieved using as a power source two conventional AAA alkaline batteries which, depending upon frequency of use, typically last for 6 months or more. As used herein, the term "fingerprint" includes thumbprints and toeprints.

Device 100 includes a logic unit 110, which may be a microprocessor, a microcontroller, an ASIC device, an FPGA or other logic devices. The specific logic device used is typically selected based on performance, cost, power-consumption and other criteria. In one embodiment of device 100, logic unit 110 is an Intel microcontroller identified by model number 80C 251TB24. Logic unit 110 is connected via bus 112 to memory unit 120. The latter includes program memory 122 and dynamic memory 124. Program memory 122 provides persistent storage of data and may comprise a read-only memory (ROM) chip, optical memory such as a CD ROM or DVD and associated reader, magnetic memory, RF ID tag technology, inductive memory and other memory usable in a wired or wireless environment. In one embodiment of memory unit 120, program memory 122 is an Atmel EPROM identified by model number 27C256R. Dynamic memory 124 provides transient storage of data generated in connection with operations performed by logic unit 110, and may comprise a random access memory (RAM) chip, e.g., an SRAM or DRAM chip. It is preferred, but not mandatory, that dynamic memory 124 include non-volatile memory for storing certain data such as fingerprint templates previously enrolled in device 100, discussed below, and other secure information. Such non-volatile memory is designed to store such templates and secure information when power is temporarily removed from device 100, e.g., while changing batteries. In selecting the non-volatile memory to be used, it is preferred the memory be capable of storing such templates and secure information for at least 1–2 minutes. While program memory 122 and dynamic memory 124 may be implemented as separate devices, depending upon the implementation of logic unit 110, program and/or dynamic memory may be an integral portion of the logic unit.

Device 100 also includes a program 126 stored in program memory 122. Program 126, in cooperation with logic unit 110 and memory 120, is responsible for performing the various operations necessary for fingerprint enrollment and verification, as discussed in more detail below. Program 126 is typically implemented as firmware, although the present invention encompasses implementation of the program as software.

Also included in device 100 is fingerprint sensor 130. The latter provides the raw image of a fingerprint positioned proximate the sensor. The relative proximity of the fingerprint to sensor 130 will depend upon the type of sensor used. With some sensors, e.g., capacitive type, the fingerprint will need to be brought into intimate contact with the outer surface of the sensor, whereas with other sensors, e.g., optical type, the fingerprint will need to positioned within about 2–5 mm of the outer surface. Thus, as used herein, the term "proximate" includes both positioning the fingerprint in intimate contact with the outer surface of the sensor and positioning the fingerprint near, but spaced from, the outer surface.

In one embodiment of the present invention, sensor 130 may be a capacitive fingerprint sensor of the type having a matrix, e.g., 224–288, of metal electrode pixels, each of which provides a gray scale output signal providing a representation of that portion of the fingerprint contacting the sensor in a digital signal, e.g., 8-bit signal. A suitable fingerprint sensor that may be used as sensor 130 is sold by Infineon Technologies AG, and is identified as the FingerTIP sensor FTF 1100 MF 1. Other types of fingerprint sensors may also be used as sensor, including optical sensors, thermal sensors and e-field sensors.

In selecting a fingerprint sensor, it is preferred that the sensor provide gray scale information on a pixel-by-pixel basis where each pixel provides such information for a sufficiently sized portion of the fingerprint to permit performance of the various operations described below. These operations are used for fingerprint enrollment and verification. Sensor 130 is generally part of device 100. However, in some cases device 100 may be constructed such that sensor 130 is not part of the device, but rather is a separate element to which device 100 is adapted to be connected.

Device 100 is designed to provide secure access to external unit 140 that is connectable with device 100 via an interface 150. Virtually any device or system may be used with device 100. Thus, for example and without limitation, external unit 140 may be any of the following devices: computing devices such as laptop computers, desktop computers, and calculators; PDAs; portable communications devices such as cellular telephones, beepers, pagers and PDAs; security systems such as those used in a home, business or automobile; weapons; and any other device where it is desired to restrict access to only previously authorized persons.

Interface 150 is used to connect device 100 to external unit 140 via connection 160. Connection 160 may be wired or wireless. In this regard, connection 160 may comprise, for example, a full duplex asynchronous serial bus standard similar to RS232, Universal Serial Bus (USB), Weigand bus, serial form, $1^2$ C, SPI, parallel, PS 2, Infrared Data Association (IrDA), Bluetooth and Palmnet, and any other wired or wireless communication protocols. In addition, connection 160 may be a custom communication protocol.

Thus, device 100 may be positioned immediately adjacent external unit 140 or may be located a substantial distance away from the external device. In fact, in some cases it may be desirable to integrate device 100 and external device 140. In this case, connection 160 may be simply a wire extending between device 100 and external device 140. When so integrated it is a misnomer to described device 140 as "external," and so this term encompasses devices 140 that are both separate from and intimately integrated with device 100.

Device 100 is powered by power source 170 that is preferably connected to the device via interface 150, but may be otherwise connected to the device. Typically, power source 170 comprises one or more batteries, e.g., two conventional 1.5 volt AAA alkaline batteries of the type sold by Eveready Battery Company, Inc. under the trademark ENERGIZER®. Of course, lithium or other longer-lasting batteries may be used as power source 170. Power source 170 may also be an external source of power, e.g., line power with power conversion and conditioning, although this will reduce the portability of device 100, which is an important but not mandatory objective of the present invention.

Program 126 includes a group of program modules for capturing, processing, manipulating, comparing and storing fingerprint data generated by fingerprint sensor 130. Software modules include sensor data capture module 200, image processing module 202, minutia extraction module 204, template creation module 206 and template compare module 208.

Program 126 also includes a database 210 for storing fingerprint templates of previously enrolled persons. Database 210 is typically a portion of memory 120, but may be contained in an external device.

Figure 3:
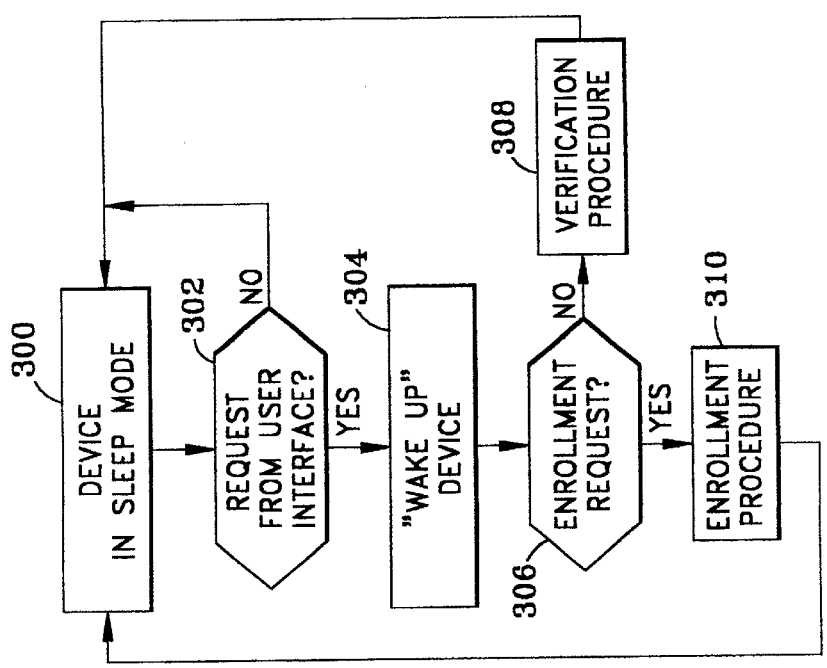
FIG. 3 is a flow diagram illustrating the steps involved in initiating operation of the device of FIG. 1.
Figure 5:
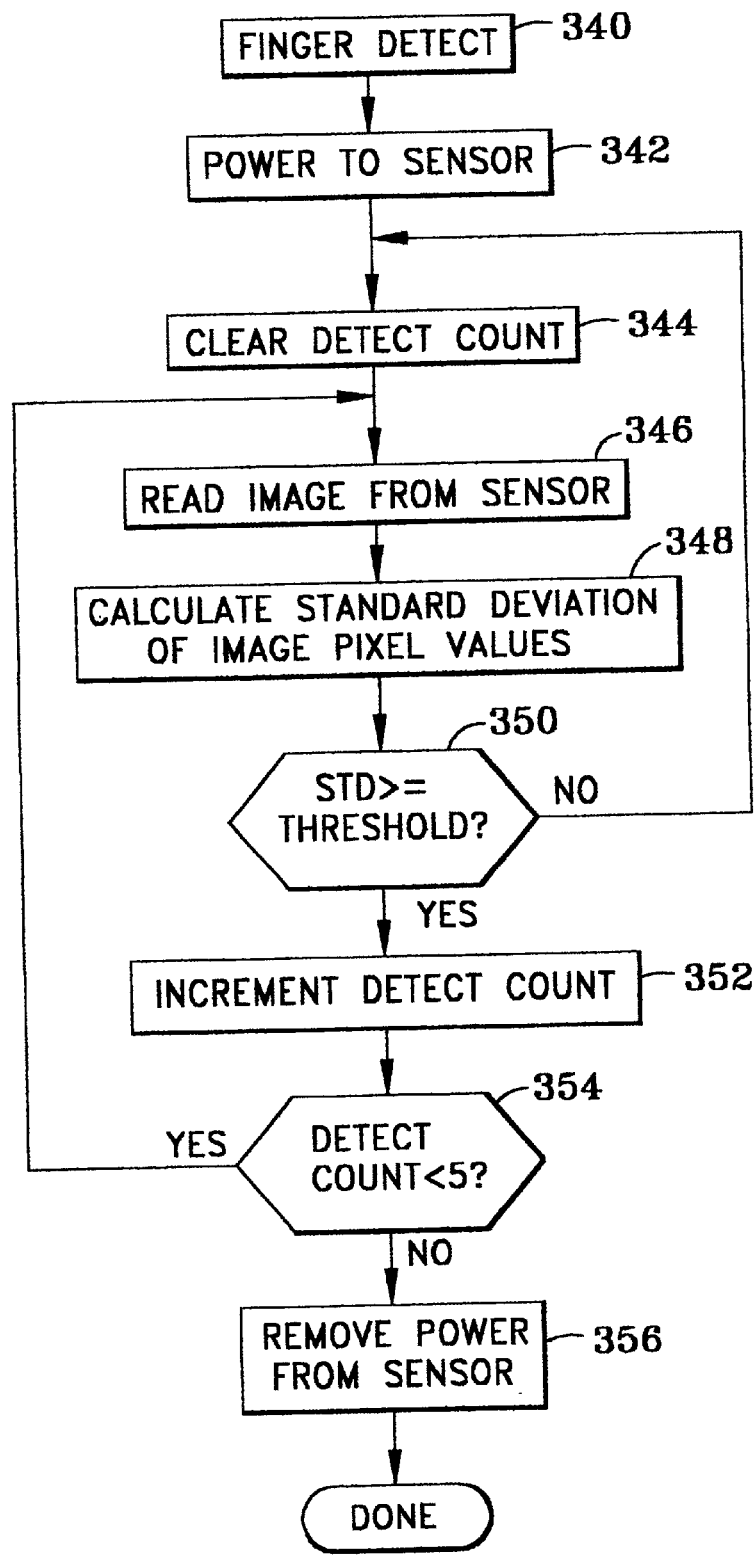
FIG. 5 is a flow diagram illustrating the steps associated with the fingerprint image detection and sensor calibration.

Turning now to FIGS. 1 and 3, in normal operation device 100 remains in "sleep" mode to conserve power, as indicated by step 300 in FIG. 3. However, if at step 302 a determination is made that interface 150 has received a request from external unit 140 to receive and capture a fingerprint, then device 100 is "awakened," i.e., powered up, as indicated at step 304. Typically, external unit 140 sends a command packet to interface 150 requesting device 100 to sense and capture the fingerprint. Logic unit 110 receives and decodes the command packet and sends a signal that activates sensor 130. Once activated, sensor 130 sends a signal containing gray scale information for a matrix of pixels corresponding to the fingerprint to logic unit 110, the capture of which is described below.

Next, at step 306, a determination is made if a request has been received to enroll a fingerprint. Fingerprint enrollment is the process by which a person that has the right to store one or more of his or her fingerprints in device 100 achieves such storage. As described in more detail below, when a user of device 100 desires to achieve access to the external unit 140 with which the device is connected, the user's fingerprint is compared with fingerprints previously enrolled in the device. If no request to enroll a fingerprint exists, then operation of device 100 proceeds to the fingerprint verification procedure, as depicted at step 308. This procedure is described in detail below, following description of the enrollment procedure. If at step 306 a determination is made that an enrollment request exists, then the fingerprint enrollment procedure is performed, as indicated at step 310.

FINGERPRINT DETECTION AND CAPTURE

Referring to FIGS. 1 and 4, fingerprint enrollment begins at step 320. The first operation is setting a timer defining the amount of time logic unit 110 will wait for fingerprint image information from sensor 130, as indicated at step 322. Next, at step 324, logic unit 110 attempts to capture fingerprint images from sensor 130. As indicated at step 326, a determination is made if device 100 has captured a fingerprint image. If not, a determination is made at step 328 if the amount of time set at step 322 has elapsed. If so, then a "no finger" signal is sent to external unit 140 at step 330 indicating a finger is not present at sensor 130. If the time has not elapsed, then another attempt is made to capture a fingerprint at step 324.

Turning next to FIGS. 1, 2, 4 and 5, the process at step 324 for capturing a fingerprint positioned proximate sensor 130 will be described in greater detail. This process is performed by sensor data capture module 200 in cooperation with logic unit 110 and memory 120. Once a request for fingerprint detection has been received via interface 150, as depicted by step 340, logic unit 110 provides a signal that results in power source 170 providing power to sensor 130, as indicated by step 342. A detect counter is then cleared at step 344, and the logic unit 110 reads the entire fingerprint image from sensor 130, as indicated by step 346, and buffers the image information in dynamic memory 124.

Next, at steps 348 and 350, a determination is made if the image information read from sensor 130 is the image of a fingerprint. This is done by calculating the standard deviation of all of the gray scale fingerprint image pixel values provided in the output signal from sensor 130, as indicated at step 348. Next, at step 350, a determination is made if the standard deviation calculated at step 348 is greater than or equal to a predetermined threshold. As a fingerprint includes a plurality of valleys with high gray scale values and a plurality of ridges with low gray scale values, if the standard deviation in gray scale values is sufficiently great, then it follows that a fingerprint is present. If the standard deviation does not exceed the threshold, then the process loops back to step 344. If it does, then a fingerprint is presumed to exist and the process to proceeds to step 352. As those skilled in the art will appreciate, the threshold is selected based on characteristics of the sensor 130, desired performance of device 100 and other factors.

A selected number, e.g., 5, fingerprint images are read by device 100 to ensure that a fingerprint is actually positioned proximate sensor 130. In some cases it may be acceptable to assume that a fingerprint is positioned proximate sensor 130 the first time the standard deviation exceeds the threshold, as determined at step 348. However, multiple readings are typically preferred to minimize the unnecessary draw on power source 170 that would arise from completing the entire fingerprint enrollment or verification process using image data that does not represent a fingerprint. At each pass through step 352 the detect counter is incremented. Then, at step 354 a determination is made if the count in the detect counter is less than the selected number. If so, the process loops back to step 346 and another fingerprint image is captured. If not, then, as depicted by step 356, sensor 130 is preferably depowered, thereby completing the fingerprint capture process. When power source 170 is line power rather than battery power, or when conserving battery power is otherwise not important, step 356 may be omitted.

There are several advantages to the above-described technique of fingerprint detection. Known fingerprint identification devices typically do not perform an initial detection step. Rather, they perform detailed image analysis, including extraction of minutia points and comparison with previously stored fingerprints, based on whatever image information is provided from sensor 130. The fact that a fingerprint was not initially detected only surfaces after completing this analysis and comparison, when it is determined no match exists. As a consequence, power from power source 170 is needlessly consumed, which can substantially reduce the life of the power source when implemented as one or more batteries. Also, use of an initial fingerprint detection step results in faster fingerprint recognition because the relatively time-consuming image analysis and comparison is avoided with respect to non-fingerprint images. Further, the standard deviation approach to fingerprint detection described above is not particularly computationally intensive, which means it can be performed quickly, using hardware resources of relatively limited computing power. The process of determining if a fingerprint is present also results in capture of a fingerprint image that is used in the enrollment and verification processes. Typically, the last fingerprint image read from sensor 130 in the iteration consisting of steps 346–354 is used in the enrollment and verification processes.

Imgae Compensation

As a consequence of manufacturing variations, and for other reasons, there is frequently a variation or offset from absolute values in gray scale values from column to columns, or row to row, of pixels in sensor 130 when the latter is a capacitance-type sensor. This results in identical fingerprint features being represented with different gray scale values, i.e., relative rather than absolute gray scale values are provided. Image processing module 202 addresses this phenomenon by determining an offset value to be added to each pixel value in a given column, or each pixel in a given row, as desired.

Image processing module 202 determines the offset values by building a histogram of the image pixel values of one of the fingerprint image columns or rows. After the histogram is constructed, a gray scale pixel value is selected above which a selected number, e.g., 5%, of the pixels values within the histogram exist. This selected gray scale pixel value is then subtracted from a predetermined number. The difference between the predetermined number and this selected pixel value is then the offset for the column. For example, if the selected gray scale value is 159 and the predetermined number is 200, then the offset is 200−159=41. This offset is then added to each pixel value for the column or row for which it is selected. This operation is then repeated for each other column, if correction is done on a column-by-column basis, or for each other row, if correction is done on a row-by-row basis. As a result of this digital smoothing of the fingerprint image information, more accurate pixel values are developed for subsequent image processing and comparison steps.

Device 100 will be described in more detail below as containing in program 126 various additional modules and steps for performing fingerprint enrollment and verification. However, in some cases it may be desirable to provide device 100 with only the features in program 126 needed to achieve the functionality described up to this point. In this regard, device may be designed to function strictly as a fingerprint capture and/or image compensation device. Thus, device 100 may be designed to capture a fingerprint image as described above and, optionally, compensate the image to account for variations in the output information provided by sensor 130. This captured fingerprint image could then be analyzed using a separate system to identify if the fingerprint matches a previously stored fingerprint. This separate system could use the verification processes described below or other fingerprint identification processes.

Ridge Orientation

Image processing module 202 includes a ridge orientation algorithm that, in cooperation with logic unit 110 and memory 120, determines the approximate slope of fingerprint ridges within local blocks of the fingerprint image, and assigns an orientation number to each local block. The orientation numbers are then used in directional filtering and minutia extraction processes, described below.

Referring to FIGS. 6a and 6b, the ridge orientation algorithm breaks up the fingerprint image 360 into local blocks 362 having a selected number of pixels, e.g., 16×16 pixels. For each pixel within a local block 362, the algorithm calculates an X gradient (dX) and an Y gradient (dY). The X gradient is equal to the pixel value of the pixel to the right of a given pixel, minus the pixel value of the pixel to the left. The Y gradient is equal to the pixel value of the pixel above a given pixel, minus the pixel value of the pixel below a given pixel. Next, the algorithm creates two numbers, slope numerator and slope denominator. The slope of the numerator is determined using the equation:

$$\Sigma(dX^2 - dY^2) \qquad (1)$$

The slope denominator is determined using the equation:

$$\Sigma(2*dX*dY) \qquad (2)$$

The two numbers obtained using equations (1) and (2) represent the ridge slope for a particular local block 362. A ridge slope, i.e., slope numerator over slope denominator, is created for every local block 362 in the fingerprint image 360.

Next, for each local block 362, the slope numerators and slope denominators for that local block are added, respectively, to the slope numerators and denominators of adjacent local blocks. This creates the local ridge slope 364 (FIG. 6b) for each local block 362. This step is performed to remove "outliers" and other aberrations in the fingerprint image that may arise from fingerprint damage, dirt on the outer surface of sensor 30 and other factors. Typically, "adjacent" local blocks 362 are those local blocks immediately above and below, immediately to the right and left, and immediately diagonally adjacent, a given local block. However, other combinations of local blocks adjacent a given local block may also be selected, e.g., (a) the immediately surrounding "ring" of local blocks and the next surrounding "ring" of local blocks or (b) only the local blocks immediately above and immediately below the given local block. Image processing module 202 then converts each local ridge slope 364 into an orientation number 366 (FIG. 6b) based on the value of the local ridge slope. In one embodiment of the present invention, orientation numbers 366 are determined as follows, with the "Ratio" column being the slope numerator divided by the slope denominator (i.e., the value of the local ridge slope 364):

| Slope Numerator | Slope Denominator | Ratio | Orientation Number | Approximate Direction |
|---|---|---|---|---|
| <0 | <0 | >=2.5 | 0 | 0° (Horizontal) |
| <0 | <0 | <2.5, >=0.4 | 1 | 22.5° |
| <0 | <0 | <0.4 | 2 | 45° |
| >=0 | <0 | >=−0.4 | 2 | 45° |
| >=0 | <0 | <−0.4, >=−2.5 | 3 | 67.5° |
| >=0 | <0 | <−2.5 | 4 | 90° (Vertical) |
| >=0 | >=0 | >=2.5 | 4 | 90° (Vertical) |
| >=0 | >=0 | <2.5, >=0.4 | 5 | 112.5° |
| >=0 | >=0 | <0.4 | 6 | 135° |
| <0 | >=0 | >=−0.4 | 6 | 135° |
| <0 | >=0 | <−0.4, >=−2.5 | 7 | 157.5° |
| <0 | >=0 | <−2.5 | 0 | 0° (Horizontal) |

While eight orientation numbers 366, each spaced 22.5° from adjacent orientation numbers, are used in the embodiment depicted in the preceding table, the present invention encompasses the use of a greater or lesser number of orientation numbers.

As described above, application of the present ridge orientation algorithm preferably results in a ridge orientation number 366 that is represented by an integer rather than a floating point number. By representing ridge orientation as an integer, logic unit 110 need not be a microprocessor, as is typically required if orientation numbers are represented with floating point numbers. Instead, a microcontroller, ASIC, FPGA or other logic with substantially less computational capability than a microprocessor may be employed as logic unit 110. This has the advantage of reducing the cost, size, power consumption and heat generation of device 100. Of course, where these factors are not relevant design parameters, a floating point number may be used for orientation number 366 along with a logic unit 110, typically a microprocessor, capable of processing a floating point number.

Directional Image Filtering

Image processing module 202 includes a directional image filter algorithm. This algorithm, in cooperation with logic unit 110 and memory 120, enhances the fingerprint image by removing imperfections that would otherwise cause ridge and valley breakage and distortion when the fingerprint is converted to a monochrome image, as discussed below.

Referring now to FIGS. 6b and 7, the directional image filter algorithm averages each gray scale fingerprint image pixel value for a target pixel with the pixel values of a selected number of pixels in close proximity to the target pixel. The selection of the other pixels in close proximity to the target pixel is based on the orientation number for the local block in which the target pixel resides. The number of pixels selected proximate the target pixel, and their spatial relationship to the target pixel, are selected based on factors such as computing capability of logic unit 110, the number of orientation numbers 366 used, and desired speed of operation of device 100.

Figure 8A:
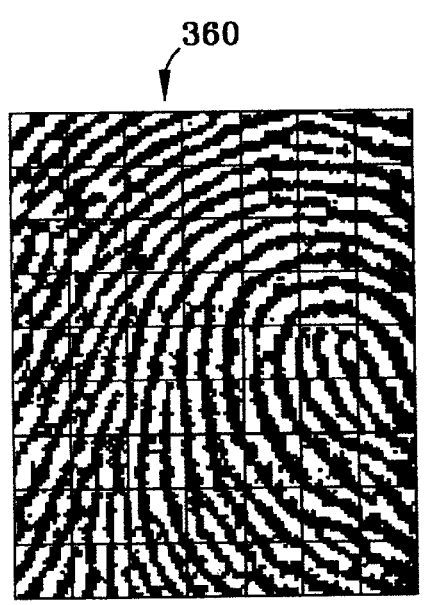
FIG. 8a illustrates a portion of a fingerprint image before directional image filtering and FIG. 8b illustrates the same portion after directional image filtering.
Figure 8B:

FIG. 7 illustrates one approach for selecting pixels using the eight orientation numbers 366 described above in connection with the discussion of FIG. 6b. In FIG. 7, the target pixel is identified as the solid black pixel and the adjacent pixels are indicated as the white pixels. The directional image filter algorithm is typically performed twice to ensure good fingerprint image quality, although the algorithm may be performed just once or more than twice. Using the pixel selection illustrated in FIG. 7, a fingerprint image 360 before application of the directional image filter algorithm is illustrated in FIG. 8a. By contrast, the same fingerprint image 360' after application of the directional image filter algorithm is illustrated in FIG. 8b.

Monochrome Conversion

Figure 9A:
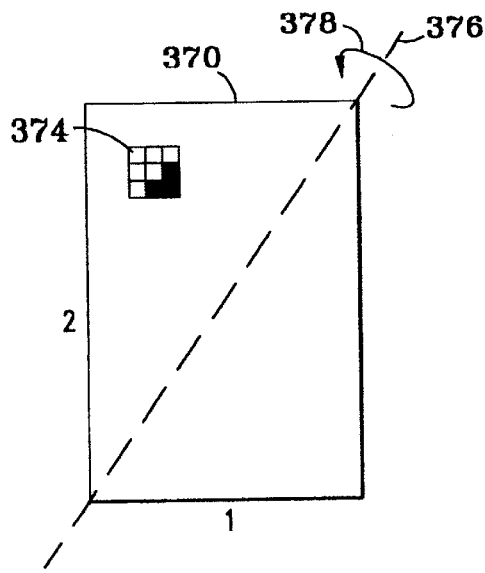
FIG. 9a is a schematic representation of a first monochrome image created from the fingerprint image and FIG. 9b is a schematic representation of a second monochrome image created from the fingerprint image, with only a limited number of the pixels of the monochrome images being illustrated in FIGS. 9a and 9a for clarity of illustration.
Figure 9B:
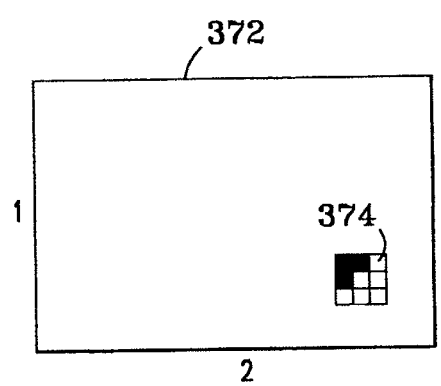

Turning now to FIGS. 1, 2, 8b, 9a, 9b and 10, image processing module 202, in cooperation with logic unit 110 and memory 120, creates a first monochrome image 370 (FIG. 9a) and a second monochrome image 372 (FIG. 9b) from the fingerprint image array resulting from the directional image filtering process described above. The objective of this process is to create clean lines consisting of only ridges and valleys. Monochrome images 370 and 372 are arrays of one-bit pixels 374 (only several of which are illustrated for purposes of clarity, and are not drawn to scale) that represent either a ridge or a valley of the fingerprint. The array of pixels 374 for first monochrome image 370 is arranged with the same number of rows and columns as the fingerprint image array resulting from the directional image filtering process. The array of pixels 374 for second monochrome image 372 has the rows and columns of first monochrome image 370 exchanged, thereby creating a diagonally flipped view of the first monochrome image. In other words, second monochrome image 372 is first monochrome image 370 rotated around axis 376 (FIG. 9a) in the direction of arrow 378 (FIG. 9a).

Describing creation of monochrome images 370 and 372 in more detail, the fingerprint image resulting from the directional filtering process is broken up into local blocks 380 (FIG. 10) consisting of a matrix of pixels 374. The present invention encompasses matrices of various size, e.g., 8 by 8 pixels, 16 by 16 pixels or other pixel counts. For each local block 380, all the pixel values for the pixels 374 of that local block and the pixels of adjacent local blocks are added together. While "adjacent" local blocks are generally the immediately surrounding local blocks (vertical horizontal and diagonal), other combinations of local blocks may be selected, as described above in connection with the description of ridge orientation determination. This total pixel value is then divided by the total number of pixel values added to obtain the pixel average value.

Next, the pixel value for each pixel 374 within a local block 308 is compared to the pixel average value. If the individual pixel value is greater than the average, a '0' bit (fingerprint valley) is inserted into monochrome images 370 and 372. Otherwise a '1' bit (fingerprint ridge) is inserted. All subsequent processing of fingerprint images is performed using monochrome images 370 and 372, as described below.

With reference again to FIG. 4, at this stage in the process all of the fingerprint image capture and processing steps are completed. Thus, the process now advances from step 326 to step 328.

Minutia Extraction

Referring to FIGS. 1, 2, 4, 9a, 9b, 10 and 11, at step 332 (FIG. 4) minutia extraction module 204 of program 126, in cooperation with logic unit 110 and memory 120, extracts minutia point identifiers. This step commences by performing an analysis of monochrome images 370 and 372 to detect occurrences of fingerprint minutia points. A minutia point is where fingerprint ridges end, begin, merge, or split. If desired, a cross and an unknown minutia point may also be considered, although these minutia points are not described below in connection with the remaining steps of the fingerprint enrollment process. The minutia extraction process begins by again breaking up monochrome images 370 and 372 into a plurality of local blocks 380, which are then analyzed one local block at a time.

Next, the orientation number 366 for each local block 380 is checked to determine if the fingerprint ridges are mostly horizontal or vertical. If the orientation number 366 is 3, 4, 5, or 6, then the fingerprint ridges of the local block 380 are more vertical than horizontal. If the fingerprint ridges are more vertical than horizontal, then local blocks 380 from first monochrome image 370 are used for the minutia extraction process. Otherwise, local blocks 380 from second monochrome image 372 are used.

Each local block 380 and its adjacent local blocks are scanned. Typically, the local blocks 380 are scanned row by row or column by column. However, the local blocks 380 may also be scanned at an angle, e.g., 45 degrees, or may be scanned in more than one or all of these ways. The adjacent local blocks 380 are scanned since it may be necessary to follow fingerprint ridges beyond the bounds of a given local block. As fingerprint ridges, i.e., groups of pixels in given row (or other scan unit such as a column or 45 degree line) having a "1" value, are detected during scanning, the position (x and y coordinates) of the ridge segments 382 (FIG. 10) are saved on a list. In the following discussion of minutia extraction, reference to rows is intended to also encompass columns, and an angled (e.g., 45 degree) line. The number of pixels 374 required to constitute a segment 382 may be selected as desired, although typically at least 2–3 pixels are required for a segment. After scanning has been completed, the list will contain all of the ridge segments 382 within the local blocks 380 scanned.

Figure 10:
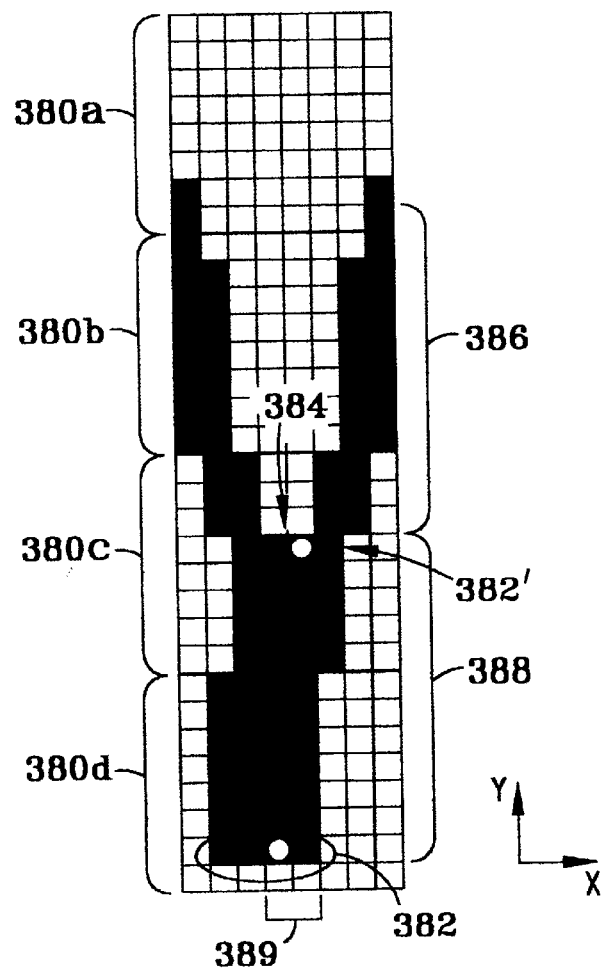
FIG. 10 is a representation of a local block where a ridge bifurcates into two ridges, and two local blocks above the local block in which the bifurcation occurs and one local block below the local block in which the bifurcation occurs.
Figure 11:
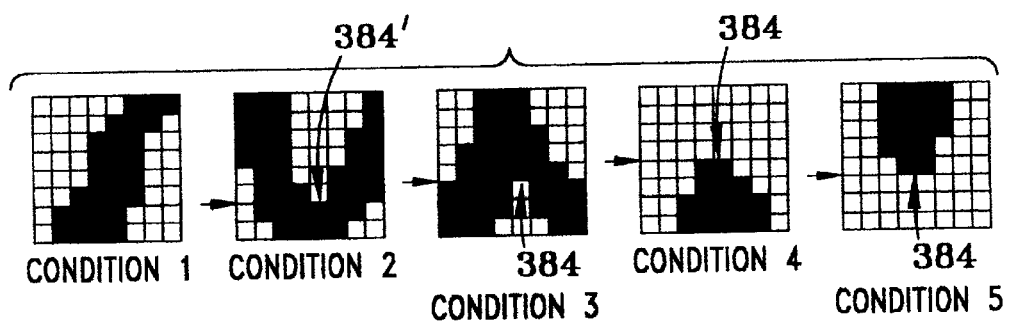
FIG. 11 illustrates 8×8 pixel monochrome images of five ridge conditions used in connection with the minutia extraction algorithms of the present invention.
Figure 12:
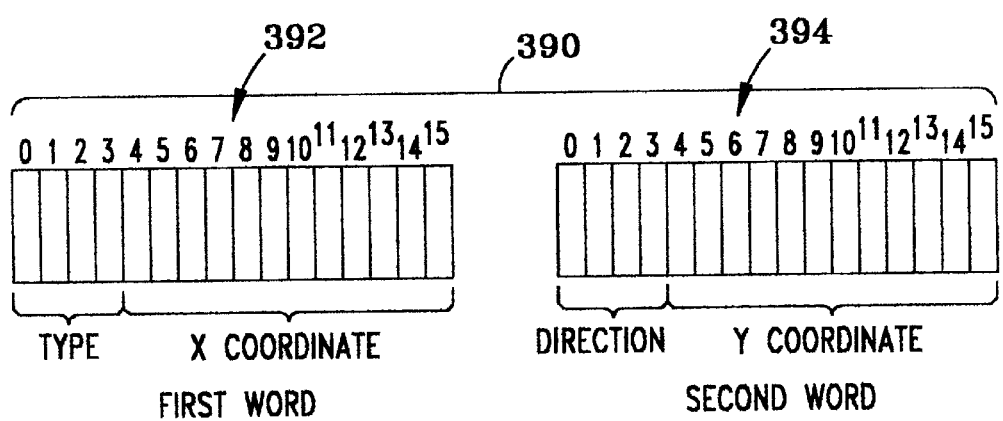
FIG. 12 is a representation of the two 16-bit words used to identify each minutia point in the fingerprint template of the present invention.

With reference now to FIGS. 9a, 9b, 10 and 11, each row (or other scan unit) of ridge segments 382 is taken in turn from the list and compared to the ridge segments of the next adjacent row to determine if a minutia point 384 (FIG. 11) occurs at the row under consideration. Any one of the five following minutia point conditions will occur, all of which are illustrated in FIG. 11:

Condition 1: One ridge segment 382 is adjacent one ridge segment of the next row;

Condition 2: One ridge segment 382 is adjacent two ridge segments of the next row;

Condition 3: Two ridge segments 382 are adjacent one ridge segment of the next row;

Condition 4: One ridge segment 382 has no adjacent ridge segments in the next row; and Condition 5: No ridge segments 382 are adjacent a ridge segment of the next row.

Condition 1 is a normal ridge with no minutia point possibilities. Condition 2 is a possible ridge bifurcation. Condition 3 is a possible merge of a bifurcated ridge. Condition 4 is a possible ridge ending. Condition 5 is a possible ridge beginning. The modifier "possible" is used here because it is conceivable that what initially appears to be a ridge end/beginning or a ridge bifurcation/merge is actually spurious fingerprint structure or image processing errors. The point at which conditions 2–5 occur is illustrated in FIG. 11 by an arrow adjacent each such condition.

To address if "possible" minutia point conditions are actually as they initially appear, each fingerprint ridge, alone or in groupings with adjacent ridges (e.g., 3 adjacent ridges), is followed for a selected number of rows (or other scan unit) away from the possible condition. Satisfactory results are achieved when the fingerprint ridge(s) are followed out 6–18 rows, although other numbers of rows may also be used. In the case of conditions 2 and 3, the bifurcated ridges and the merged ridge, respectively, are followed out a selected number of, e.g., 12, rows to insure that there are no other conditions 2, 3, 4, or 5 nearby. In the case of conditions 4 and 5, the ridge in which a possible ending or beginning exists, respectively, is followed out for a selected number of, e.g., 12, rows looking for other conditions 2, 3, 4, or 5. For example, with reference to FIG. 10, if a condition 2 (ridge bifurcation) minutia point 384' is identified in local block 380c, then the bifurcated ridges are followed away from ridge segment 382', where the bifurcation occurs, into local blocks 380b and 380a for a selected number of rows, as indicated by bracket 386. Similarly, the ridge leading up to ridge segment 382' is followed, beginning a selected number of rows before the ridge segment as indicated by bracket 388, toward the ridge segment.

Fingerprint ridges and ridge bifurcations, as represented by ridge segments 382, are followed away from a possible minutia point 384 in the same direction as the ridge and ridge bifurcation leading up to the possible minutia point. This is done by determining the slope of the ridge leading up to the possible minutia point 384 (also considered as the direction of the minutia point), as described in more detail below.

If as result of following out ridges and ridge bifurcations a selected number of rows (or other scan unit) no conditions 2, 3, 4 and 5 exist, then three identifiers are saved to a minutia list. The first identifier is the position of the ridge segment 382 where the ridge ends, begins, bifurcates or two ridges merge (i.e., a bifurcation merger), as indicated with arrows relative to conditions 2–5 in FIG. 11. The position is based on Cartesian (x,y) coordinates where row 0, column 0 of the fingerprint image is the origin (0,0). This is typically the lower left corner of monochromes images 370 and 372, although other origins may be used. The x coordinate corresponds to the columns of the fingerprint image, and the y coordinate corresponds to the rows.

The second identifier is the direction or slope of the ridge(s) leading up to the ending, beginning, bifurcation or bifurcation merger. The direction is preferably described by one of a selected number of integers, each representing an equal, but unique, portion of a 360 degree span. In one embodiment, sixteen integers, 0 to 15, are used to represent successive 22.5 degree directions. However, a lesser or greater number of integers may be used to identify the direction of ridge(s) leading up to the minutia point 384.

This direction or slope is determined by using the following information:

The condition associated with the minutia point (i.e., conditions 2, 3, 4 or 5);

The slope of the fingerprint ridge leading to the minutia point; and

The monochrome image, i.e., image 370 or 372, from which the local block 362 is being scanned.

Referring particularly to FIG. 10, the slope of the fingerprint ridge leading up to the minutia point 384 is determined relative to the fingerprint ridge selected in accordance with the following convention:

For conditions 2 and 4, the fingerprint ridge leading to the minutia point is presumed to come from below (from the perspective of FIG. 10).

For conditions 3 and 5, the fingerprint ridge leading to the minutia point is presumed to come from above (from the perspective of FIG. 10).

As the first step, the position of the minutia point is set to the middle (in the x-direction as seen in FIG. 10) of the ridge segment 382 in which it is located, as identified by a white dot in FIG. 10. When the ridge segment 382 has an even number of pixels, then a rule is established to define the center, e.g., the pixel immediately to the right of center is chosen as the center of the ridge segment. At the completion of following the fingerprint ridge, as selected per the convention described above, the x-direction (as illustrated in FIG. 10) center position of the ridge segment 382 where the minutia point 384 resides is subtracted from the x-direction position of the midpoint of the ridge segment in the last row followed, as also identified by a white dot in FIG. 10. This change in x-direction, indicated by bracket 389 in FIG. 10 represents the approximate direction of the fingerprint ridge for the given minutia point 384. From this direction the integers representing direction, as described above, are selected using predetermined correlation factors stored in a lookup table, or otherwise determined. In one embodiment of the invention where sixteen integers are used to represent direction of ridges leading to a minutia point, the following correlation is used:

| Condition 2 or 4 | | Condition 3 or 5 | |
|---|---|---|---|
| x | Dir. | x | Dir. |
| First Monochrome Image | | | |
| <−17 | 7 | <−17 | 15 |
| −17 to −9 | 6 | −17 to −9 | 14 |
| −8 to −3 | 5 | −8 to −3 | 13 |
| −2 to 2 | 4 | −2 to 2 | 12 |
| 3 to 8 | 3 | 3 to 8 | 11 |
| 9 to 17 | 2 | 9 to 17 | 10 |
| >17 | 1 | >17 | 9 |
| Second Monochrome Image | | | |
| <−17 | 13 | <−17 | 5 |
| −17 to −9 | 14 | −17 to −9 | 6 |
| −8 to −3 | 15 | −8 to −3 | 7 |
| −2 to 2 | 0 | −2 to 2 | 8 |
| 3 to 8 | 1 | 3 to 8 | 9 |
| 9 to 17 | 2 | 9 to 17 | 10 |
| >17 | 3 | >17 | 11 |

The third identifier defines the type of minutia point, i.e., ridge ending, beginning, bifurcation and merger of two ridges (i.e., bifurcation merger).

In some cases, one or more of conditions 2, 3, 4 or 5 will be found to exist during the process of confirming possible minutia points 384 by scanning out from such possible minutia points. When this occurs, the possible minutia point condition is assumed not to be a valid condition and so is ignored.

After all of the ridge segments 382 previously saved in the list have been compared, the process is repeated with the next local block until all local blocks have been independently processed. This completes the minutia extraction process of step 332.

Template Creation

Turning now to FIGS. 1, 2, 4, 12 and 13, at step 334 (FIG. 4) template creation module 206, in cooperation with logic unit 110 and memory 120, creates a fingerprint template. The fingerprint template is the data structure used to uniquely identify an individual's fingerprint. A template is made up of a list the three identifiers for each minutia points that were created during the minutia extraction process.

Each minutia point entry in the template preferably consists of two sixteen-bit words, although other formats may also be used. The two words are identified at 390 in FIG. 12. The lower twelve bits of first word 392 identify the x coordinate of the ridge segment 382 where the minutia point 384 exists. The center of the ridge segment 382 is used as the x-direction value, with the pixel immediately to the left or right or center being used consistently as the center when the ridge has an even number of pixels. The upper four bits of first word 392 identifies the minutia point type. A '1' value indicates a minutia endpoint (both beginning and ending), and a '2' value indicates a minutia bifurcation (both ridge split and ridge merger). The lower twelve bits of second word 394 identify the Y coordinate of the minutia point 374. The upper four bits of second word 394 represent the direction number for the ridge(s) leading up to minutia point 374. Each fingerprint template is stored in database 210 in program memory 122 for future use in the fingerprint verification procedure, described below, and where provided, in non-violative memory in dynamic memory 124.

The fingerprint template is sized to contain a fixed number of minutia point entries. In one embodiment, 64 entries are permitted, although greater and lesser numbers may also be used. The number of minutia point entries permitted in the fingerprint template defines the maximum number of minutia points allowed for any individual fingerprint.

An important advantage of representing a fingerprint image in the fingerprint template in the manner described above is that an extremely limited amount of memory is required to store all the information required for fingerprint verification, to a high degree of accuracy, as described below. In one embodiment of the present invention, only 256 bytes of data are required to represent such information. This feature makes the present invention ideally suited for applications where low cost is important, where the product format requirements prohibit use of memory devices of relatively large size, or where it is otherwise desirable to limit the amount of memory needed to perform fingerprint verification. By contrast, known fingerprint identification systems typically require substantially more than 1 K bytes of data to store information representing a fingerprint. Also, a person's fingerprint is not stored in the fingerprint template, only the three minutia point identifiers for each minutia point 384 discussed above. Consequently, in the event of theft or other loss of device 100, a user's fingerprint cannot be scanned out or otherwise obtained.

At this stage, enrollment of a fingerprint is completed, as depicted by step 336 in FIG. 4. Thus, as indicated in FIG. 3, enrollment procedure step 310 is completed and device 100 is returned to sleep mode, per step 300. If at step 306, it is determined that an enrollment request has not been received, then the process proceeds to step 308, where the verification procedure is performed.

Template Compare

Figure 13:
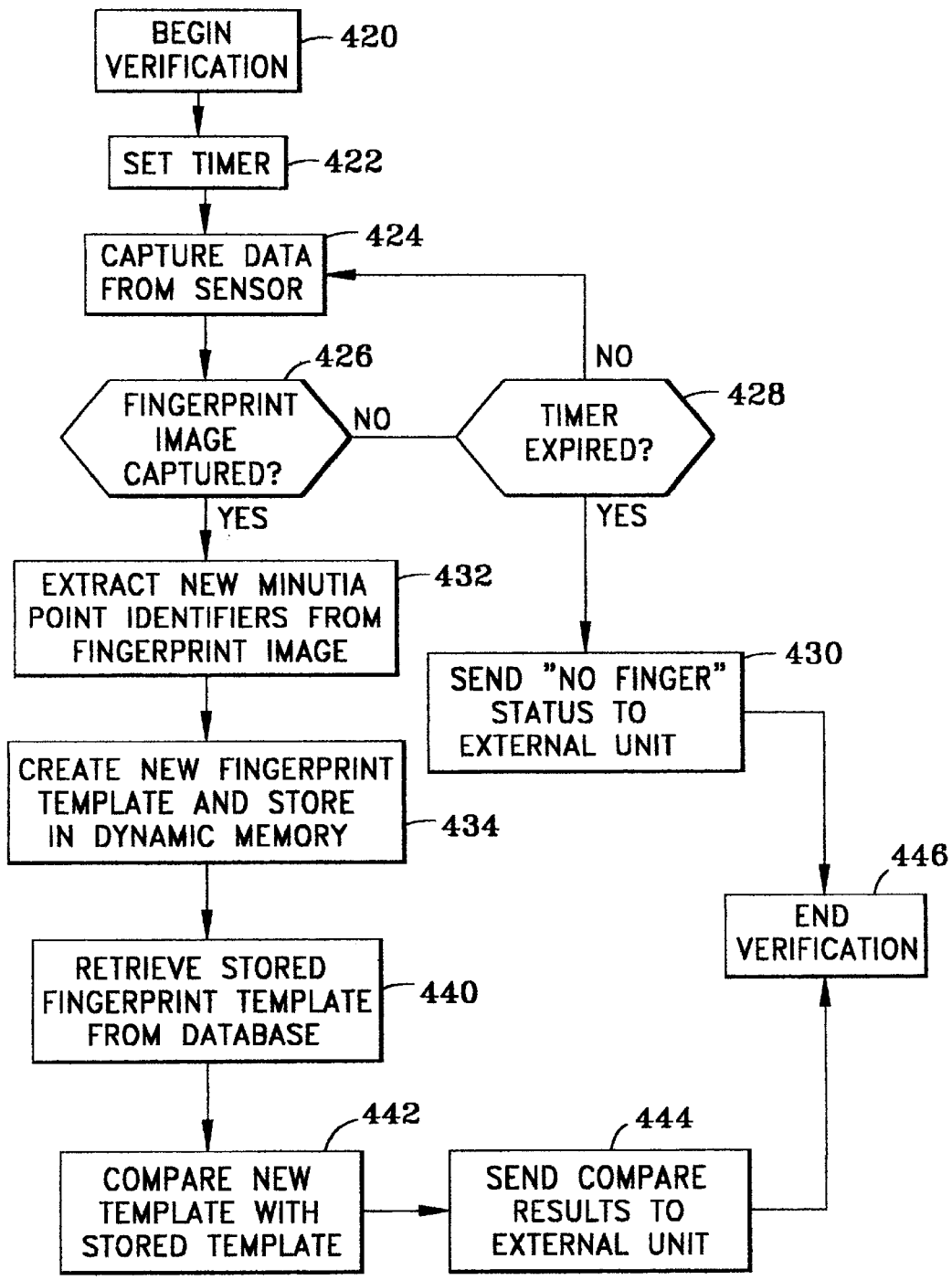
FIG. 13 is a flow diagram of the fingerprint verification process of the present invention.

Turning now to FIGS. 1, 2. 3, 13 and 14, at step 308 (FIG. 3) the process of comparing a person's previously enrolled fingerprint, which is stored in database 210 in the form of a fingerprint template, with a fingerprint of a user is performed. This process is illustrated in FIG. 13 and is described below. The process is performed by template compare module 208, in cooperation with logic unit 110 and memory 120. The result of the comparison is a count of matching minutia points between the two fingerprint templates. As described below, if the count exceeds a predetermined threshold, then access to external unit 140 is authorized.

The fingerprint verification comparison process begins with the same steps as the fingerprint enrollment process described above and illustrated in FIG. 4. Thus, steps 420, 422, 424, 426, 428, 430, 432 and 434 are identical to steps 320, 322, 324, 326, 328, 330, 332 and 334, respectively, are so are not described again, except to note that the fingerprint of a potential user of external unit 140 is captured and translated into a fingerprint template in steps 420–434. Also, the new fingerprint template is typically stored in dynamic memory 124, rather than in database 210 in program memory 122.

After the new fingerprint template is created and stored in dynamic memory 124 at step 434, the fingerprint template for the previously enrolled fingerprint is retrieved from database 210, as indicated by step 440. Next, at step 442, the new fingerprint template is compared with the fingerprint template stored in database 210 to determine if they match.

In connection with the following description of the template compare process, the fingerprint template for the previously enrolled fingerprint will be referred to as T1 and the fingerprint template for the user seeking to obtain access to external device 140 will be referred to as T2. Since all fingerprint templates are structured the same, assignment of T1 and T2 is arbitrary.

Figure 14A:
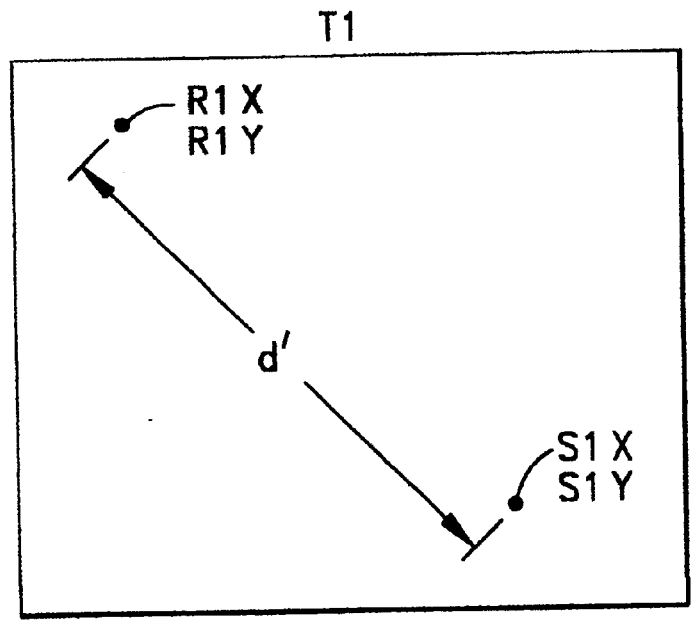
FIG. 14a is a schematic representation of a fingerprint template of a user of the present invention.
Figure 14B:
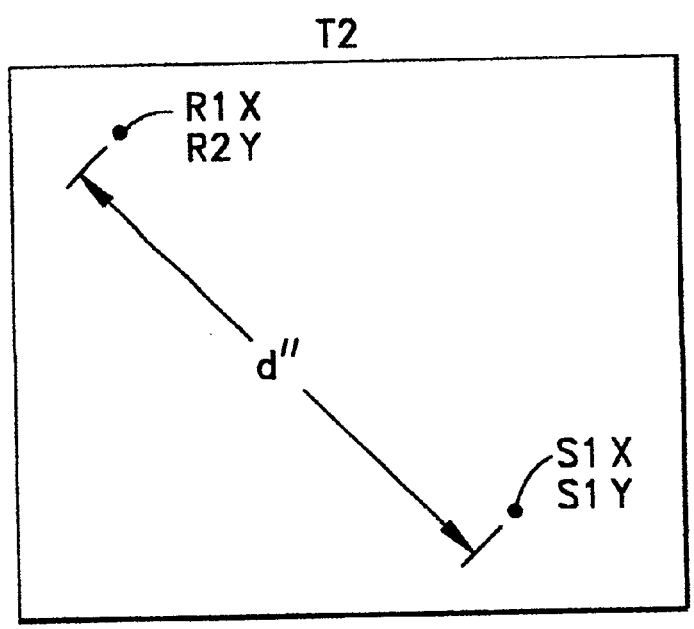
FIG. 14b is a schematic representation of a fingerprint template for a person previously enrolled in the device of the present invention.

The first step of the template comparison process is to determine origin reference points for each template, as illustrated in FIGS. 14a and 14b. These will be referred to as [R1x, R1y] (reference point for T1), and [R2x, R2y] (reference point for T2). To do this, the algorithm takes one of the minutia points from T1, typically the first minutia point in the minutia point list, and searches in T2 for a minutia point that is "similar." To qualify as similar, the two minutia points must be of the same minutia point type, and the direction of the ridge(s) leading to first minutia point [R1x, R1y] must be approximately the same as the direction of the ridge(s) leading to second minutia point [R2x, R2 y]. While some flexibility exists concerning how close these two directions need to be, in one embodiment of the present invention the directions must be within 22.5 degrees of one another. The third criteria for similarity between [R1x, R1y] and [R2x, R2 y] is that the x and y coordinates defining the location of the minutia points must be within a specified distance from each other. It is generally satisfactory for this third criteria that minutia points [R1x, R1y] and [R2 x, R2 y] be within 50% of the width of monochrome image 370 from one another, although other proximity values are encompassed by the present invention. This completes the process of selecting origin reference points for the first iteration, which process is repeated for subsequent iterations.

Since fingers can almost never be placed twice on exactly the same location on fingerprint sensor 130, and fingerprints change slightly due to expansion and contraction of the skin induced by changes in temperature, finger pressure on the sensor, humidity and other factors, template comparison module 208 compensates for these variations. Once [R1x, R1y] and [R2x, R2y] have been established, another minutia point [S1x, S1y] is selected from T1 that has a coordinate at least 64 pixels (other distances are also encompassed by the present invention) away from [R1x, R1y]. T2 is now searched for a minutia point [S2x, S2y], which is of the same minutia point type and approximate associated ridge direction as [S1x, S1y], and is approximately (e.g., 25%) the same distance from [R2x, R2y] as [S1x, S1y] was from [R1x, R1y]. Thus, referring to FIGS. 14a and 14b, distance d' in template T1 between [R1x, R1y] and [S1x, S1y] is approximately the same as distance d" in template T 2 between [R2x, R2y] and [S2x, S2y].

With the four minutia points selected from above, a pair of vectors is created, [V1x, V1y] and [V2x, V2y], where:

$$V1x=S1x-R1x$$

$$V1y=S1y-R1y$$

$$V2x=S2x-R2x$$

$$V2y=S2-R2y$$

From these two vectors, the coordinate correction factors Cx and Cy are calculated:

$$Cx=(V2x*V1x)+(V2y*V1y)/(V2x*V2x)+(V2y*V2y)$$

$$Cy=(V2x*V1y)-(V2y*V1x)/(V2x*V2x)+(V2y*V2y)$$

Next, a vector [Vax, Vay] is created for each remaining minutia point [A2x, A2y] in T2:

$$Vax=A2x-R2x$$

$$Vay=A2x-R2x$$

To this vector, the coordinate correction factors are applied, and a target coordinate is created:

$$A1x=((Vax*Cx)-(Vay*Cy))+R1x$$

$$A1y=((Vax*Cy)+(Vay*Cx))+R1y$$

T1 is now searched to find a minutia point that is the same type and approximate direction as [A2x, A2y], and approximately the same coordinates as [A1x, A1y] (within, e.g., 6 pixels of distance). If a match is found, a match count is incremented and saved such that the saved match count always represents the highest match count achieved for the templates T1 and T2 undergoing comparison. The template compare begins the next iteration with the selection of a new origin reference points [R1x, R1y] from T1, except now any minutia point in T1 with respect to which the highest match count was generated in prior iterations is excluded from selection. If a later iteration yields a higher match count, then the excluded T1 minutia point may be made available for comparison. Each subsequent iteration preferably begins with the process of selecting a "similar" minutia point in template T2, as described above and illustrated in FIGS. 14a and 14b, and the determination of coordinate correction factors for the minutia points in template T2, as also described above. When all possible selections of [R1x, R1y] and [R2x, R2y] have been tried, the template compare returns the highest match count of all the compare iterations.

Upon completion of the template comparison process, logic unit 110 sends a signal via interface 150 to external unit 140 indicating whether or not the new user should be provided access to the external unit, as indicated by step 444 (FIG. 13). When the match count is greater than or equal to a predetermined threshold, then the signal indicates access should be provided to external unit 140. Based on this signal, internal hardware and software/firmware in external unit 140 then permits the user to use the external unit. The specific threshold used with the match count in determining whether access should be provided is typically selected based on the importance of restricting unauthorized users from accessing external unit 140. For example, higher security may be appropriate for an automobile than for a cellular telephone.

Verification is ended, as depicted by step 446, after the results of the comparison are sent to the external device 140. Thereafter, sensor 130 is returned to the sleep mode, as indicated by step 300 (FIG. 3), and device 100 draws almost no power until the next request is received from external device 140 for a fingerprint verification.

The fingerprint verification procedure identified at step 308 has been described as a procedure that is implemented with program 126 using logic unit 110, memory 120 and other elements of device 100. However, the present invention is not so limited. In some cases it may be desirable to implement the fingerprint verification procedure in a device remote, either structurally or physically, from portions of device 100 used to perform enrollment. In such case, two similar devices 100 would be provided, with the devices differing primarily in that template compare module 208 need not be included in the first device and sensor data capture module 200, image processing module 202, minutia extraction module 204 and template creation module 206 need not be included in the second device. Of course, each device 100 could include all modules in program 126, but only use those modules required for verification, in the case of the second device, and those modules required for everything including enrollment, in the case of the first device.

Device 100 is capable of performing fingerprint verification with a high degree of accuracy. In one embodiment of the present invention, device 100 achieves a false accept rate of less than about 0.3% and a false reject rate of less than about 3%. However, depending upon the level of security desired, match count thresholds used in step 442 (FIG. 13) and other aspects of program 126 may be designed and/or selected to achieve false accept rates as high as about 1% and false reject rates as high as about 10%. Furthermore, device 100 can complete the verification process relative to a previously enrolled fingerprint with this degree of accuracy using less than 1 W, typically about 400 mW, of peak power in less than about 10 seconds, typically about 7 seconds.

The information included in the fingerprint template T1 may be used for purposes other than comparison with a second fingerprint template T2. For example, the information in the fingerprint template may be used in applications where a unique identifier of a person is required. One such application is a digital signature.

The preceding discussion of device 100 has been presented relative to a single fingerprint stored in a template T1 in database 210. However, multiple fingers for a person may be stored in database 210. Also, the fingerprints of multiple persons may be stored in database 210.

An important advantage of device 100, as noted above, is that due to its minimal power consumption and memory requirements, it may be readily implemented in a battery-powered, portable, completely standalone device. However, because the various approaches used in the fingerprint capture, enrollment and verification processes of device 100 are far less computationally intensive than known process, the processes may be performed using microprocessor-based or digital signal processing-based hardware at a substantial increase in speed relative to known fingerprint enrollment and verification algorithms.

Fingerprint verification is one of a number of biometric traits that may be used to identify a person in connection with limiting access to external device 140. Thus, the present invention may be used in connection with the capture, enrollment and verification of other biometric traits. Thus, while fingerprint sensor 130 has been described as a fingerprint sensor, the present invention encompasses sensors that provide information regarding other biometric traits in the form of a plurality of gray scale pixel values. Such other traits include, without limitation, configuration of a body member such as a hand, iris patterns and retinal patterns from eyes.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. A biometric verification device for providing secure access to a unit connected to the device, the device comprising:
   a. a biometric sensor capable of sensing a biometric trait of a user that is unique to said user and providing a first signal containing information representing said biometric trait; and
   b. a processing unit connected to said biometric sensor so as to receive said first signal, said processing unit being adapted to compare said information with biometric data stored in said processing unit representing a biometric trait of an enrolled person, and provide a verification signal indicating whether or not said information corresponds sufficiently with said biometric data to verify said user is said enrolled person, wherein said processing unit completes said comparison and generates said verification signal within 20 seconds of when said biometric sensor senses said biometric trait, said biometric sensor and processing unit, together being configured to use no more than 1W of peak power.

2. A device according to claim 1, wherein said biometric trait is a fingerprint.

3. A device according to claim 1, wherein said biometric trait is an iris pattern from an eye.

4. A device according to claim 1, wherein said processing unit completes said comparison and generates said verification signal using no more than 400 mW of peak power.

5. A device according to claim 1, wherein said processing unit completes said comparison and generates said verification signal within 7 seconds of when said biometric sensor senses said biometric trait.

6. A device according to claim 1, wherein said processing unit stores said biometric data representing a biometric trait of an enrolled person using no more than 1 K bytes of data.

7. A device according to claim 6, wherein said processing unit stores said biometric data representing a biometric trait of an enrolled person using no more than 256 bytes of data.

8. A device according to claim 1, further including one or more batteries that comprise the sole source of power for the device.

9. A device according to claim 1, wherein said processing unit includes non-volatile memory for storing said biometric data representing said biometric trait.

10. A device according to claim 1, further including a wireless interface for connecting the device with the unit.

11. A device according to claim 1, further including a wires interface for connecting the device with the unit.

12. A device according to claim 1, wherein said processing unit performs said comparison with false acceptance rate of less than 0.5% and a false rejection rate of less than about 5%.

13. A device according to claim 1, further including an external unit connected to said processing unit, said external unit being operable independently of said sensor and processing unit upon receipt of said verification signal indicating said user is said enrolled person.

14. A device according to claim 13, wherein said external unit is remote from said sensor and processing unit.

15. A device according to claim 13, wherein said external unit is physically proximate said sensor and processing unit.

16. A device according to claim 1, further wherein said processing unit modifies said image to account for variations in said output signal from an absolute value arising from at least one of (a) manufacturing variations and (b) expansion and contraction arising from changes in pressure and environmental factors.

* * * * *

UNITED STATES PATENT AND TRADEMARK OFFICE
CERTIFICATE OF CORRECTION

PATENT NO. : 6,766,040 B1
DATED : July 20, 2004
INVENTOR(S) : John F. Catalano

It is certified that error appears in the above-identified patent and that said Letters Patent is hereby corrected as shown below:

Column 20,
Line 7, "wires" should be -- wired --.

Signed and Sealed this

Second Day of November, 2004

JON W. DUDAS
*Director of the United States Patent and Trademark Office*